Figure 1:
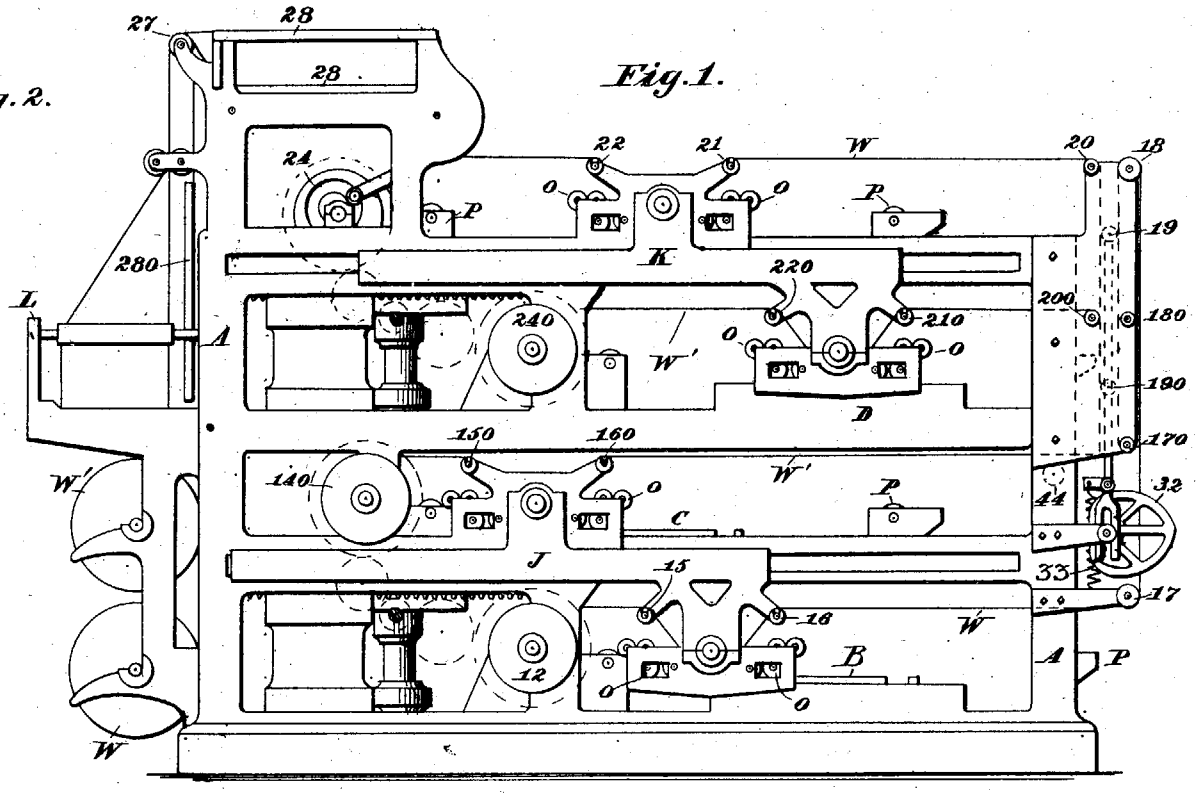

No. 12,016. Reissued July 22, 1902.

H. A. W. WOOD.

DOUBLE MULTIPRESS.

(Application filed June 6, 1902.)

7 Sheets—Sheet 1.

Witnesses:
M. E. Regan.
M. E. Pride.

Inventor:
H. A. W. WOOD.
By Smithgate & Smithgate
attorneys

No. 12,016. Reissued July 22, 1902.

H. A. W. WOOD.

DOUBLE MULTIPRESS.

(Application filed June 6, 1902.)

7 Sheets—Sheet 2.

Witnesses:
M. E. Regan
M. E. Arde.

Inventor:
H. A. W. WOOD.
By
Smithgall & Smithgall
attorneys

No. 12,016. Reissued July 22, 1902.

H. A. W. WOOD.

DOUBLE MULTIPRESS.

(Application filed June 6, 1902.)

7 Sheets—Sheet 3.

Witnesses:
M. E. Regan.
M. E. Forde.

Inventor:
H. A. W. WOOD,
By
Southgate & Southgate
Attorneys

No. 12,016. Reissued July 22, 1902.

H. A. W. WOOD.

DOUBLE MULTIPRESS.

(Application filed June 6, 1902.)

7 Sheets—Sheet 4.

Witnesses:
M. E. Regan.
M. E. Forde.

Inventor:
H. A. W. WOOD,
By
Smithgall & Smithgall
attorneys

No. 12,016. Reissued July 22, 1902.
H. A. W. WOOD.
DOUBLE MULTIPRESS.
(Application filed June 6, 1902.)
7 Sheets—Sheet 5.
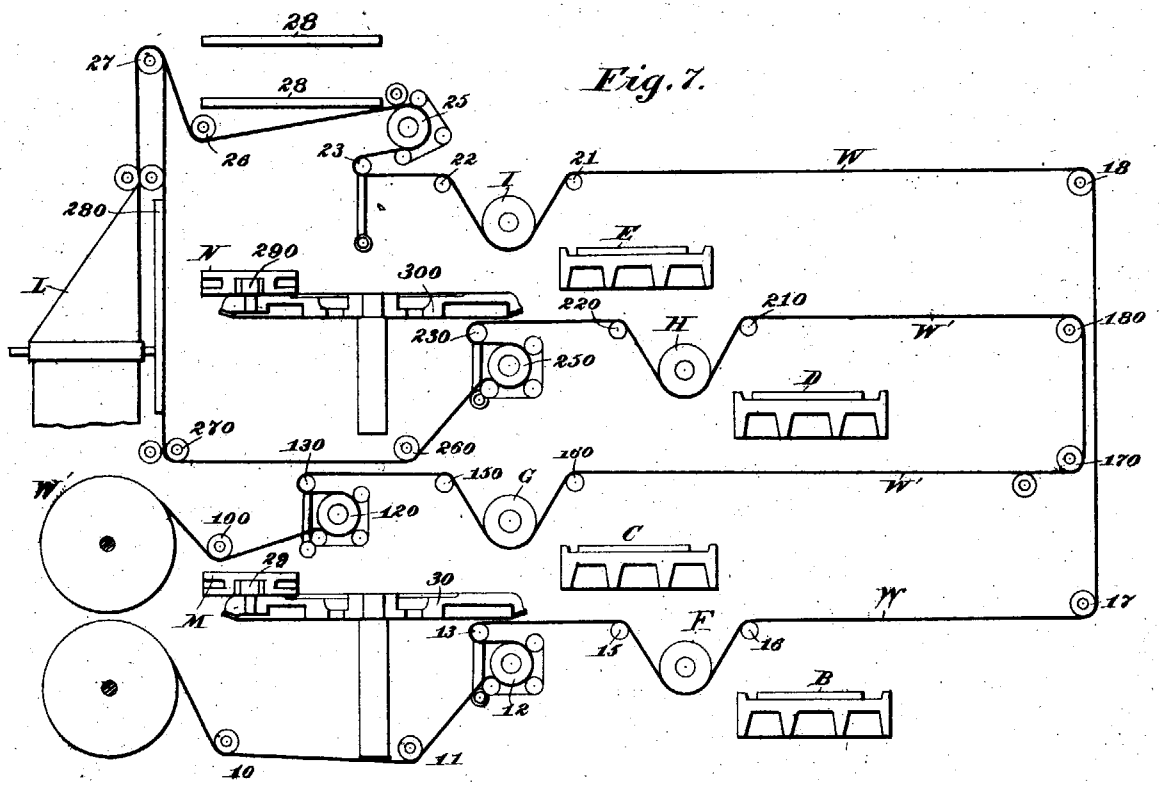
Witnesses:
M. E. Rigan
M. E. Forde
Inventor:
H. A. W. WOOD.
By
Smithgate & Smithgate
attorneys No. 12,016. Reissued July 22, 1902.
H. A. W. WOOD.
DOUBLE MULT PRESS.
(Application filed June 6, 1902.)
7 Sheets—Sheet 6.
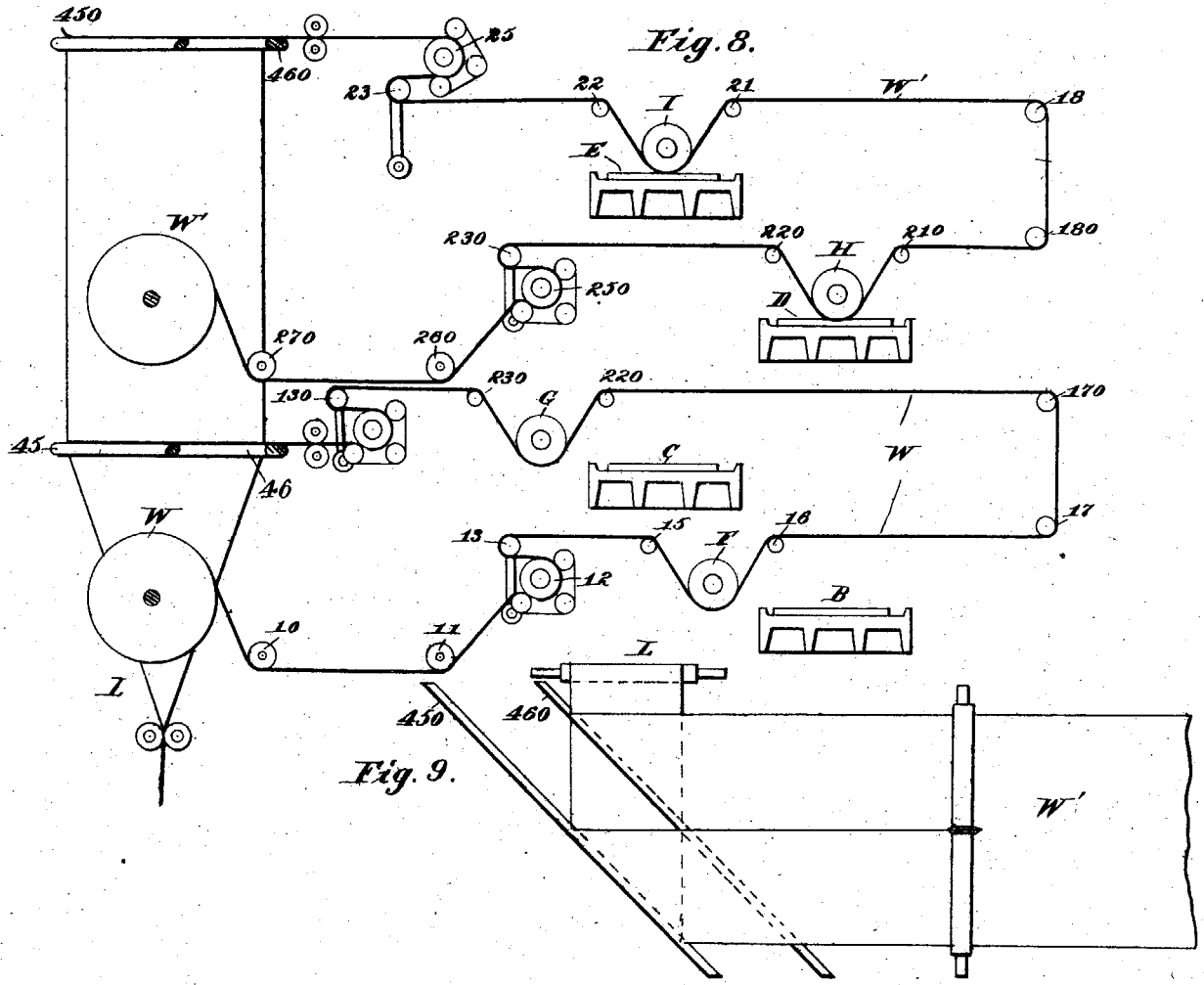
Witnesses:
M. E. Regan.
M. E. Forde.
Inventor:
H. A. W. WOOD.
By
Huttenger & Huttenger
Attorneys No. 12,016. Reissued July 22, 1902.
H. A. W. WOOD.
DOUBLE MULTIPRESS.
(Application filed June 6, 1902.)
7 Sheets—Sheet 7.
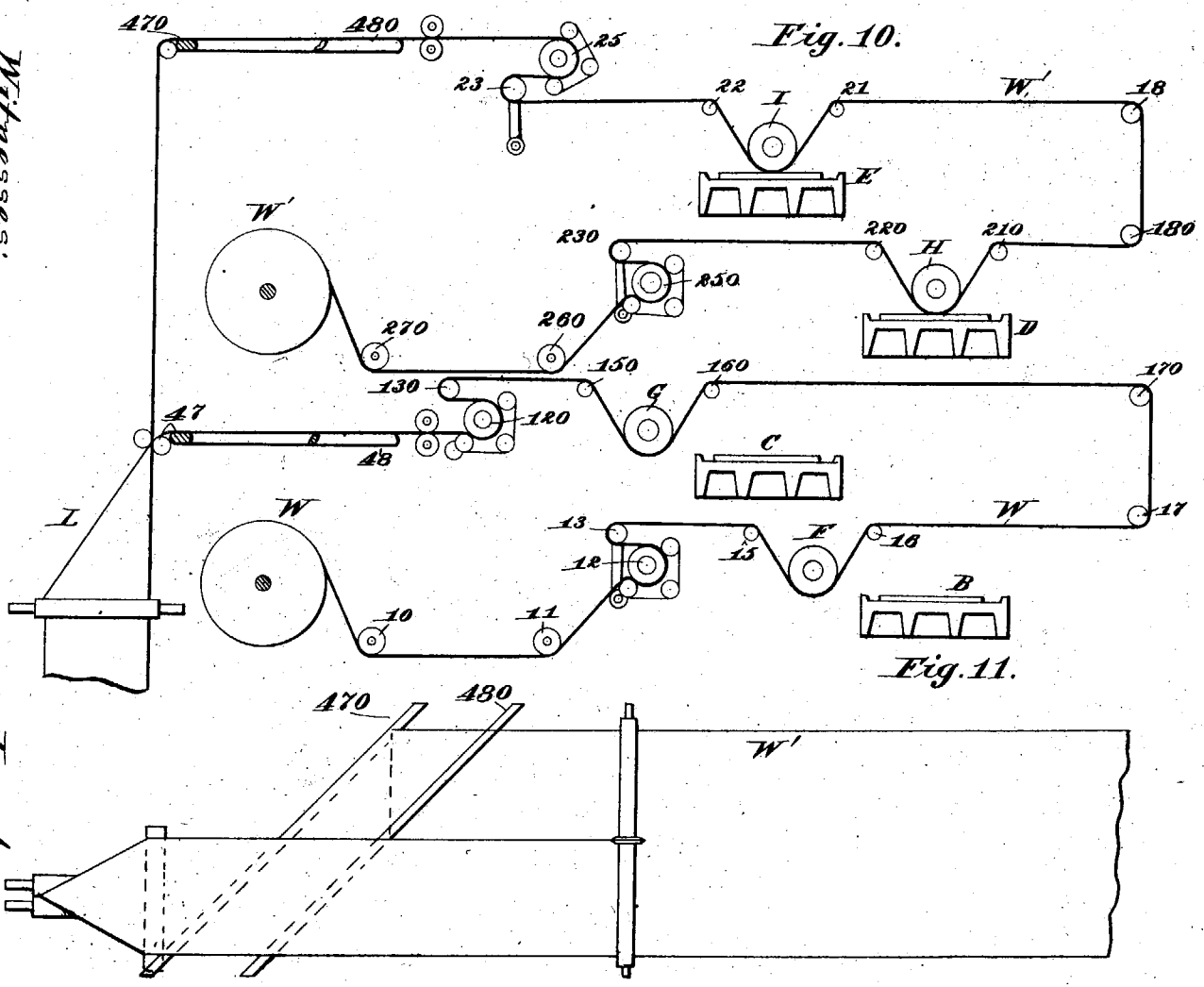
Witnesses:
M. E. Regan,
M. E. Forde.
Inventor:
H. A. W. WOOD
By attys
Lutherglate & Lutherglate

UNITED STATES PATENT OFFICE.

HENRY A. WISE WOOD, OF NEW YORK, N. Y.

DOUBLE MULTIPRESS.

SPECIFICATION forming part of Reissued Letters Patent No. 12,016, dated July 22, 1902.

Original No. 701,120, dated May 27, 1902. Application for reissue filed June 6, 1902. Serial No. 110,484.

*To all whom it may concern:*

Be it known that I, HENRY A. WISE WOOD, a citizen of the United States, residing at New York, in the county of New York and State of New York, have invented a new and useful Double Multipress, of which the following is a specification.

The object of my present invention is to improve the style of printing-machine which is known as the "flat-bed traveling-cylinder web-printing machine." This machine consists of two beds, on which the forms are placed, and two traveling impression-cylinders, one for each bed. Suitable guides and web-manipulating devices are provided, so that the web will be perfected in its passage through the machine—that is, printed on both its sides. The operation is such that the web stands stationary relatively to the forms during impression, the cylinders and guides carrying moving loops or waves of web and presenting the web to the forms, and the web is shifted or fed forward when the cylinders reverse off the forms in either direction. Presses of this character have been commercially made so that four forms can be placed abreast on each of the two beds, and by this arrangement either a four, six, or eight paged paper can be produced. It has been found impractical, however, to make the machine produce more than an eight-paged paper, because if the machine is made wider the cylinders will spring and will not give good impressions, and, on the other hand, if more than one form is placed in line the speed of the machine will be reduced, owing to the increase of stroke of the cylinders required. There has been a call, however, for a machine which will make a larger-sized paper or product, the call for which machine has not been satisfactorily supplied. To supply the demand for a machine of this character, it has heretofore been proposed to arrange two machines side by side and associate the two webs issuing from such machines to make the larger-paged products. It has also been proposed in an another case to arrange two machines end to end and to associate the two webs to get the larger-paged products. These arrangements, however, have been very undesirable on account of the great floor-space required, the complication of the mechanism for bringing the products together, and the inconvenience in getting around and handling such arrangements.

My present invention aims to supply a machine which shall produce not only the four, six, or eight paged paper of the single machine, but also the ten, twelve, fourteen, or sixteen paged papers now wanted without decreasing the speed.

My present invention consists in arranging two flat-bed traveling-cylinder web-perfecting presses one directly over the other and in providing mechanism so that two webs can be led through the machine and perfected and then associated and folded to form the desired ten, twelve, fourteen, or sixteen paged papers.

The preferred form in which I practice this invention consists in providing two separate driving mechanisms for the four cylinders, one mechanism being used to operate the two lower cylinders and the other driving mechanism being used to operate the two upper cylinders. These two driving mechanisms may be set to work in unison with each other at one hundred and eighty degrees to each other, or quartering—that is, at ninety degrees to each other. If the two driving mechanisms are set quartering, the two lower cylinders will be in impression or printing while the two upper cylinders are reversing, and vice versa. If this arrangement is used, the double machine will run very smoothly and easily.

In the preferred form of machine I run the webs through in a peculiar way. One web is run so as to be printed on one side by the lower cylinder and on its other side by the upper cylinder. The second web is run through the machine so as to be printed on one side by the second cylinder and on its other side by the third cylinder. By this arrangement the two web-rolls will be kept low down, and the two printed webs will issue from the machine above the same, so that they can be easily associated. It will be seen that by this construction one web is practically within the loop of the other web in the machine. If this arrangement is used in a machine in which the two driving devices for the cylinders are set quartering, it is necessary to provide a compensating looping mechanism at the front end of the machine which will compensate for the relatively different movements of the cylinders, so that the feed of each web will take place around only one cylinder at a time. Rollers, turners, and slitters are provided, so that the two webs can be slit and associated to make any desired double produce, and a suitable folding device is provided, so that the associated webs may be cut into sheet form and given any desired number of folds.

When it is desired to run this machine to handle only one web to make a four, six, or eight paged product, the upper driving mechanism is disconnected and the lower machine only is used. When this operation takes place, I may use what was the feeding-in device for the upper web as the feeding-out device for the single web simply by driving what was the feeding-in device in the opposite direction and actuating what was the feeding-in looper oppositely, so that the same will form a feeding-out looper. Another way I may lead the single web out is to lead the same out through the feeding-in device which is provided for the inner web of the double machine. Thus this machine can be advantageously used either as a single or double machine.

If I do not set the driving mechanisms quartering, but to act in unison or at one hundred and eighty degrees to each other, I can dispense with the compensating looping mechanism at the front end of the machine. Thus a paper of any desired number of even pages up to sixteen may be produced with but little trouble, and the machine may be changed to produce the different-paged products in a few moments, and the device occupies the floor-space of but one machine.

According to a first modified form of my invention I lead the first web to the two lower cylinders and the second web to the two upper cylinders and turn the webs out at the side of the machine by suitable turners and associate them by suitable rollers and fold them by a folding device, which preferably is arranged at right angles to the machine proper.

A second modified form of my invention consists in arranging the machine as last described and in running the webs out beyond the web-rolls and folding them beyond the web-rolls. While this is a good arrangement, it is not as desirable as the preferred form, as it necessarily involves putting the upper web-roll into the machine between two webs and because of the extra floor-space required to do this and to arrange the folding device beyond the web-rolls.

The preferred form of my invention is that previously described as the principal form.

Figure 2:
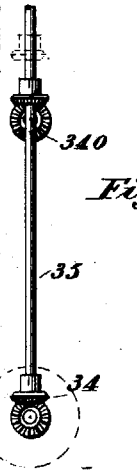
Figure 3:
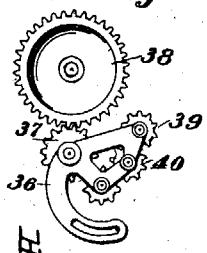
Figure 4:
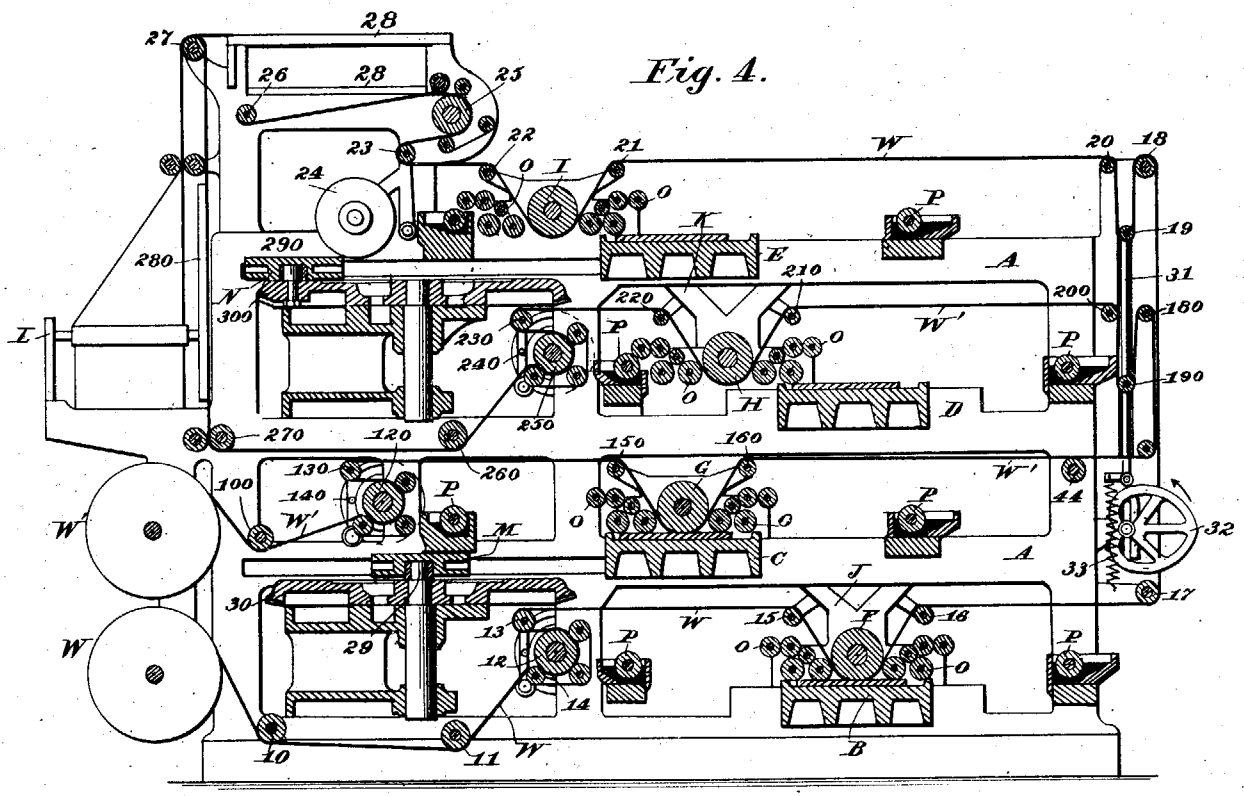
Figure 5:
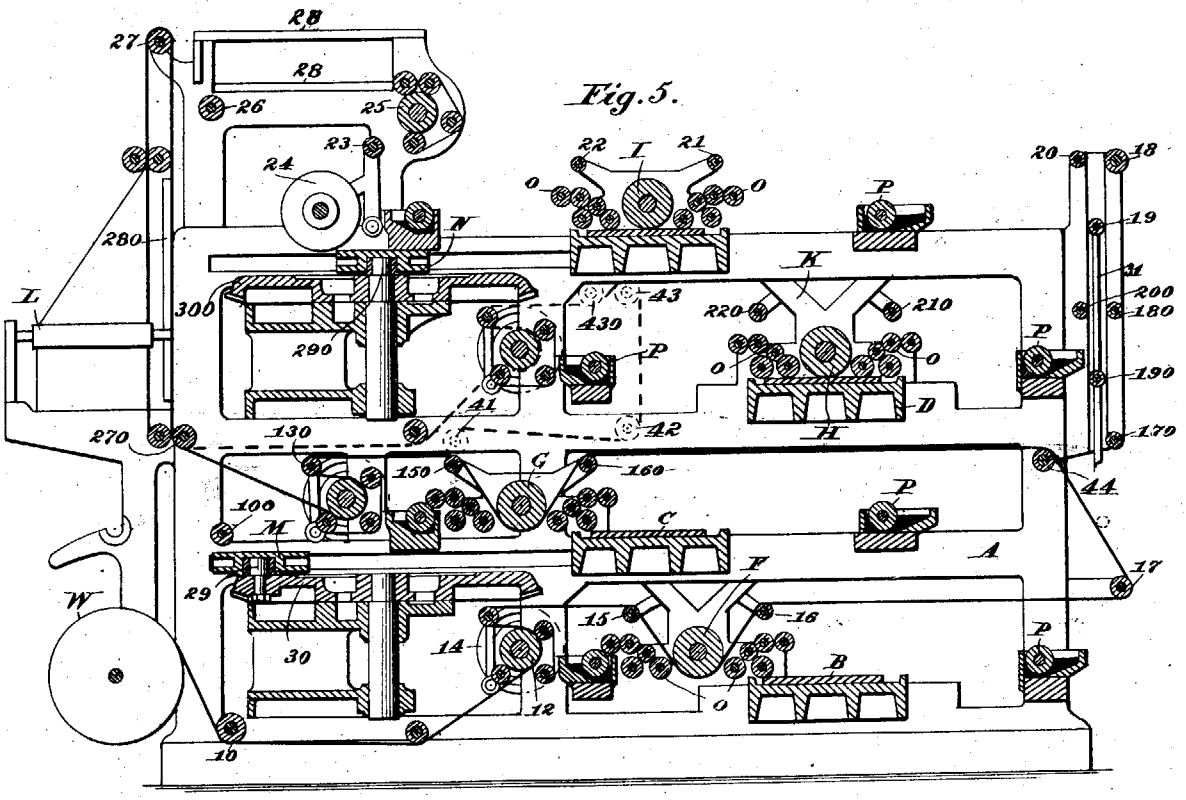
Figure 6:
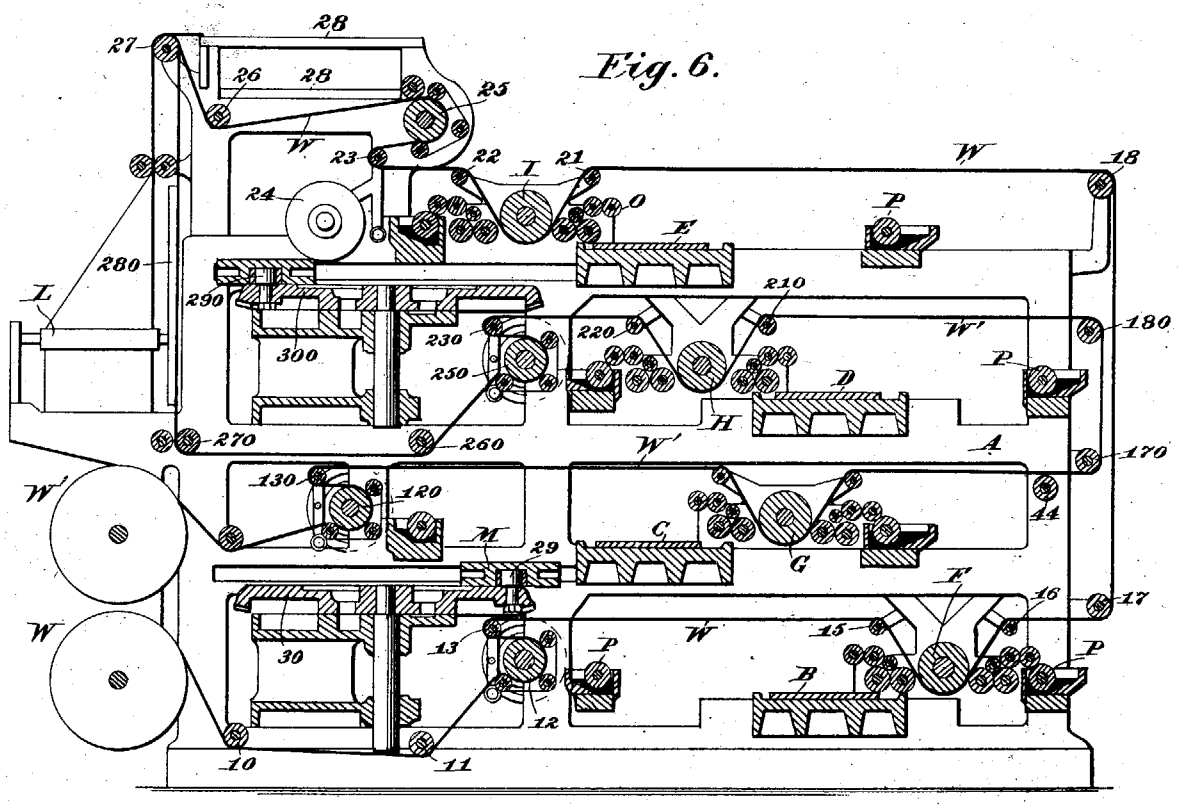

Referring to the accompanying seven sheets of drawings, which illustrate the various ways in which my invention can be practiced, Figure 1 is a side elevation of the complete machine. Figs. 2 and 3 are detail views of the gearing. Fig. 4 is a sectional elevation of the complete machine. Fig. 5 is a similar view illustrating the arrangement when but a single web is run through the machine. Fig. 6 is a view similar to Fig. 4 with the driving mechanism set at one hundred and eighty degrees to each other. Fig. 7 is a diagrammatic view similar to Fig. 6 with the driving mechanisms set to work in unison. Fig. 8 is a diagrammatic sectional view of the first modified form of my invention. Fig. 9 is a plan view of the turners used in the device shown in Fig. 8. Fig. 10 is a diagrammatic sectional view of the second modified form of my invention, and Fig. 11 is a plan view of the turners used in the device shown in Fig. 10.

Referring to the drawings and in detail, I will first describe the preferred form of my invention—that is, the form wherein one web is within the loop of the other web. The various arrangements of this preferred form are shown in the first five sheets of the drawings.

In detail, A designates the framing of the press.

B, C, D, and E represent four form-beds, which preferably are arranged horizontally and in different horizontal planes. F, G, H, and I designate the four traveling impression-cylinders, which coact with said beds.

J represents the lower carriage-frames for cylinders F and G, and K the upper carriage-frames for cylinders H and I.

Two web-rolls W and W′ are mounted at the end of the machine. The web *w* from web-roll W first passes around guide-rollers 10 and 11 to a feeding-in drum 12, which has a suitable set of tapes coacting therewith to continuously feed the web into the press. The web then passes around a feeding-in looping-roller 13, which is actuated by cams 14 on the shaft of the feeding-in drum 12. The web then passes to guide-roll 15, mounted in the carriage-frames J under the lower impression-cylinder F, and up over guide 16, also mounted in frames J. The web then passes around web guides or rolls 17 and 18, attached to the frame A, then around a compensating looper 19, and then around a web guide or roll 20, secured to the frame of the machine. The web then passes to guide 21, mounted in frames K, under the upper impression-cylinder I, and around the guide 22, also arranged in said frames K. The web then passes around a feeding-out looper 23, actuated from cams 24, to a continuously-running feeding-out drum 25, coacting with which is a suitable set of tapes. From this point the web may be slit into two sections and one carried directly by guides 26 and 27 to a suitable folder L and the other section of the web led around turner-bars 28 28 and suitable parallel rollers before it passes to the guide or roller 27, so that the two sections of the web will be associated together before they pass to the folder. The web *w′* is similarly led around the second and third impression-cylinders G and H, the parts, guides, rollers, &c., being figured the same as in connection with the web $w$, except that a cipher is added to each reference-numeral—as, for example, the guide or roll corresponding to the guide or roll 10 is referred to as 100, the feeding-in drum corresponding to the feeding-in drum 12 is referred to as 120, &c. The turners 280 280 for associating the two sections of the web $w'$ are arranged beyond the guide or roll 280 and preferably stand in a vertical position at the end of the press, so that the two sections of the web $w'$ may be associated together before they pass to the guide or roll 27 to be associated with the sections of the web formed by the web $w'$.

The lower carriage-frames J are connected together by a suitable tie or yoke M, engaging which is a crank-pin 29 on the large bevel-gear 30. The carriage-frames K are similarly connected by yoke N, engaging which is a crank-pin 290, arranged on bevel-gear 300. These parts form the two driving mechanisms.

In the first three sheets of the drawings the driving mechanisms are shown as set quartering, or at ninety degrees to each other, so that the two lower cylinders will be in impression or printing while the two upper cylinders are reversing, and vice versa, whereby the machine will run very easily and smoothly. If this arrangement is used, it is necessary to use the compensating loopers 19 and 190. These compensating loopers are arranged in suitable sliding frames 31, which have rolls bearing on cams 32, which are held in contact with said cams by springs 33. The cams 32 are geared to turn in unison with the cams for the feeding-in and feeding-out loopers, and by this arrangement each web will only be fed or shifted over one form-bed at a time. Thus, for example, in Fig. 4 the web $w$ is stationary relatively to the lower bed B and is being shifted over the upper bed E. The looper 19 is moving upward and is giving the supply of web necessary for the movement over the upper bed. When the cylinder F is reversing and the cylinder I printing, the looper 19 will be moving downward. This will cause the web to be shifted over the lower bed and the web to stand stationary over the upper bed. The same is true of the web $w'$ and the looper 190. The feeding-in and feeding-out drums and the feeding-in and feeding-out loopers are arranged to operate in the ordinary way—that is, the feeding-in and feeding-out drums are arranged to feed a length of web equal to two sheets for each forward and backward movement or complete reciprocation of the cylinders, and the feeding-in and feeding-out loopers are arranged to shift the web at the proper times, which is twice for each reciprocation of the cylinders. The compensating loopers 19 and 190 are arranged to control an amount of web equal to the length of the sheet—that is to say, the time in which the web stands stationary and in which it is shifted being substantially the same the compensating loopers will have a movement of one-half of the sheet's length, so as to control an amount of web equal to the length of the sheet. Suitable inking-rollers O are arranged in the carriage-frames at each side of each impression-cylinder to ink the forms, and the same take ink from fountain P. By manipulating two webs in this manner a ten, twelve, fourteen, or sixteen paged paper can be obtained.

When it is desired to make a smaller-sized paper, one of the driving mechanisms, preferably the upper driving mechanism, is disconnected, so that only the two lower cylinders F and G will operate.

The shafts on which the bevel-pinions which engage the bevel-gears 30 and 300 are arranged may be geared together, as shown in Fig. 2, by means of bevel-gears 34 and 340 and shaft 35.

Power may be applied to the lower set of bevel-gears, and the upper driving mechanism may be disconnected by slipping the bevel-gear 340 on its shaft.

When a single web is run through the machine, it is preferred to use what was the feeding-in device for the web $w'$ as the feeding-out device. If this is done, it is necessary to turn the shaft of the drum 120 in the opposite direction. This can be done by using a sweep 36, which carries a single intermediate 37, which can mesh directly with the gear 38 on the shaft of the drum, and two other meshing intermediates 39 and 40, which may be shifted to transmit motion to said gear 38, so that the same will turn in the opposite direction, as illustrated in Fig. 3. When the single web is run through the machine in this manner, the same is led to the folder, as shown in full lines in Fig. 5. Another way in which the single web can be delivered out of the machine is to keep what was the feeding-out device for the web $w'$ in operation and lead the web $w$ thereto by means of web guides or rolls 41, 42, 43, and 430, as indicated in dotted lines in Fig. 5. By either of these arrangements a single web can be perfected by the two lower impression-cylinders and led out of the machine to form either a four, six, or eight paged paper.

When the two lower impression-cylinders are used to perfect a single web, the single web is passed directly from the guide 17 to the impression-cylinder G by means of guide or roll 44.

In Fig. 6 I have shown substantially the same mechanism with the two driving mechanisms set at one hundred and eighty degrees to each other. When this is done, the web-compensating device at the front end of the press is not necessary, as all the impression-cylinders will be in and out of impression at the same time.

The arrangement shown in Fig. 6 is an excellent form of the invention, as the two sets of carriage-frames will be moved oppositely, and hence the vibrations in the mechanism will be to a large measure counterbalanced.

In Fig. 7 I have shown substantially the same machine with the two driving mechanisms set to work in unison.

In Figs. 8 and 9 I have shown the first modified form of my invention referred to—that is, an arrangement by which the web *w* is handled by the impression-cylinders F and G and the web *w'* by the impression-cylinders H and I. In this arrangement the two webs are slit, and the sections thereof are associated and turned out sidewise or laterally of the machine by turner-bars 45 and 46 and 450 and 460, and the folder mechanism is arranged at right angles to the press.

In Figs. 10 and 11 I have shown the second modified form of my invention—that is, the two lower impression-cylinders are arranged to handle the web *w* and the two upper impression-cylinders the web *w'*, and the two sections of each web are associated by turner-bars 47 and 48 and 470 and 480 and pass out to a folding mechanism beyond the web-rolls. The beds are shown in the drawings as offset—that is, the bed C is not over the bed B and the bed E is not over the bed D. This is the preferred form, as it renders the beds very accessible for putting on and taking off the forms.

The specific relative arrangement of two form-beds in different horizontal planes and one in advance of the other is not claimed in this case, as the same forms the subject-matter of claims in my application for patent filed January 3, 1898, Serial No. 665,358.

It is within the scope of my invention, of course, to arrange the beds directly over each other, if desired.

I am aware that other arrangements may be made without departing from the scope of my invention as expressed in the claims.

Having thus fully described my invention, what I desire to secure by Letters Patent is—

1. The combination of two flat-bed traveling impression-cylinder web-perfecting printing-presses arranged one over the other, web-guides arranged so that two webs can be led through the mechanism, and devices for associating the two webs after they are perfected.

2. The combination of two side frames, four form-beds mounted therein in different horizontal planes, two sets of carriers fitted to said frames, each set carrying two impression-cylinders and web-guides, mechanism for reciprocating the two sets of carriers, web-guides for leading two webs through the machine, and manipulating devices for shifting said webs around the cylinders during the non-impression periods.

3. The combination in a web-perfecting printing-press of four form-beds arranged in different horizontal planes, a traveling impression-cylinder coöperating with each form-bed, web-guides arranged so that a web may be led around the lower and upper cylinders, and another web around the second and third cylinders, and a suitable web-manipulating device for each web.

4. The combination in a web-perfecting printing-press of four form-beds arranged in different horizontal planes, a traveling impression-cylinder coöperating with each form-bed, web-guides arranged so that a web may be led around the lower and upper cylinders, and another web around the second and third cylinders, whereby the last-named web is substantially within the loop of the first-named web, a suitable web-manipulating device for each web, and devices for associating the two webs.

5. The combination of two flat-bed traveling impression-cylinder web-perfecting printing-presses arranged one over the other, web-guides arranged so that one or two webs can be led through the mechanism, and means whereby one or both presses may be operated.

6. The combination in a web-perfecting printing-press of four form-beds arranged in different horizontal planes, a traveling impression-cylinder coöperating with each form-bed, web-guides arranged so that one or two webs may be led through the mechanism, two driving mechanisms, one arranged to reciprocate the two lower and the other the two upper cylinders, and connections whereby one driving mechanism can be thrown out of operation.

7. The combination in a web-perfecting printing-press, of four form-beds arranged in different horizontal planes, two sets of carriers, each set carrying two impression-cylinders, a driving mechanism for each set of carriers, web-guides arranged so that one or two webs may be led through the mechanism, web-manipulating mechanisms, and connections whereby only one set of carriers can be operated.

8. The combination in a web-perfecting printing-press of four form-beds arranged in different horizontal planes, a traveling impression-cylinder coacting with each form-bed, web-guides arranged so that a web may be led around the lower and upper cylinders, and another web around the second and third cylinders, a feeding-in and feeding-out device for each of these webs, and means whereby the feeding-in device for the second web may be used as the feeding-out device when only one web is run through the machine, whereby the two lower impression-cylinders may be used for handling a single web.

9. The combination of four form-beds, two sets of carriers, two impression-cylinders journaled in each set of carriers, and a driving mechanism for each set of carriers, said two driving mechanisms being set substantially quartering relatively to each other.

10. The combination of four form-beds, four impression-cylinders, web-guides and web-manipulating mechanisms arranged so that two webs can be printed, and two driving mechanisms, each driving mechanism being connected to reciprocate two cylinders, said two driving mechanisms being set substantially quartering relatively to each other, whereby two cylinders will be in impression or printing while the other two cylinders are reversing and vice versa.

11. The combination of four form-beds arranged in different horizontal planes, an impression-cylinder coöperating with each form-bed, a driving mechanism for the two lower impression-cylinders, a driving mechanism for the two upper impression-cylinders, said two driving mechanisms being set quartering relatively to each other, web-guides for leading a web around the lower and upper impression-cylinders, web-guides for leading another web around the second and third impression-cylinders, a feeding-in and feeding-out device for each web, and a compensating looping mechanism for the webs arranged so that the feed of each web will take place only around one cylinder at a time.

12. The combination of four form-beds arranged in different horizontal planes, an impression-cylinder coöperating with each bed, a driving mechanism for the two lower impression-cylinders, a driving mechanism for the two upper impression-cylinders, said driving mechanisms being set quartering relatively to each other, web-guides for leading a web around the lower and upper impression-cylinders, web-guides for leading another web around the second and third impression-cylinders, a feeding-in and a feeding-out device for each web, and a compensating looping mechanism for the webs, consisting of cam-actuated frames carrying a looping-roller for each web arranged so that the feed of each web will take place only around one cylinder at a time.

In testimony whereof I have hereunto set my hand in the presence of two subscribing witnesses.

H. A. WISE-WOOD.

Witnesses:
J. H. GUNNING,
JAS. H. CRAFT.